June 22, 1965   J. P. MALEC   3,190,266
FLUID APPLICATOR FOR ANIMALS
Filed Jan. 23, 1963   2 Sheets-Sheet 1

INVENTOR
JERRY P. MALEC
BY
ATTORNEYS

June 22, 1965  J. P. MALEC  3,190,266
FLUID APPLICATOR FOR ANIMALS
Filed Jan. 23, 1963  2 Sheets-Sheet 2
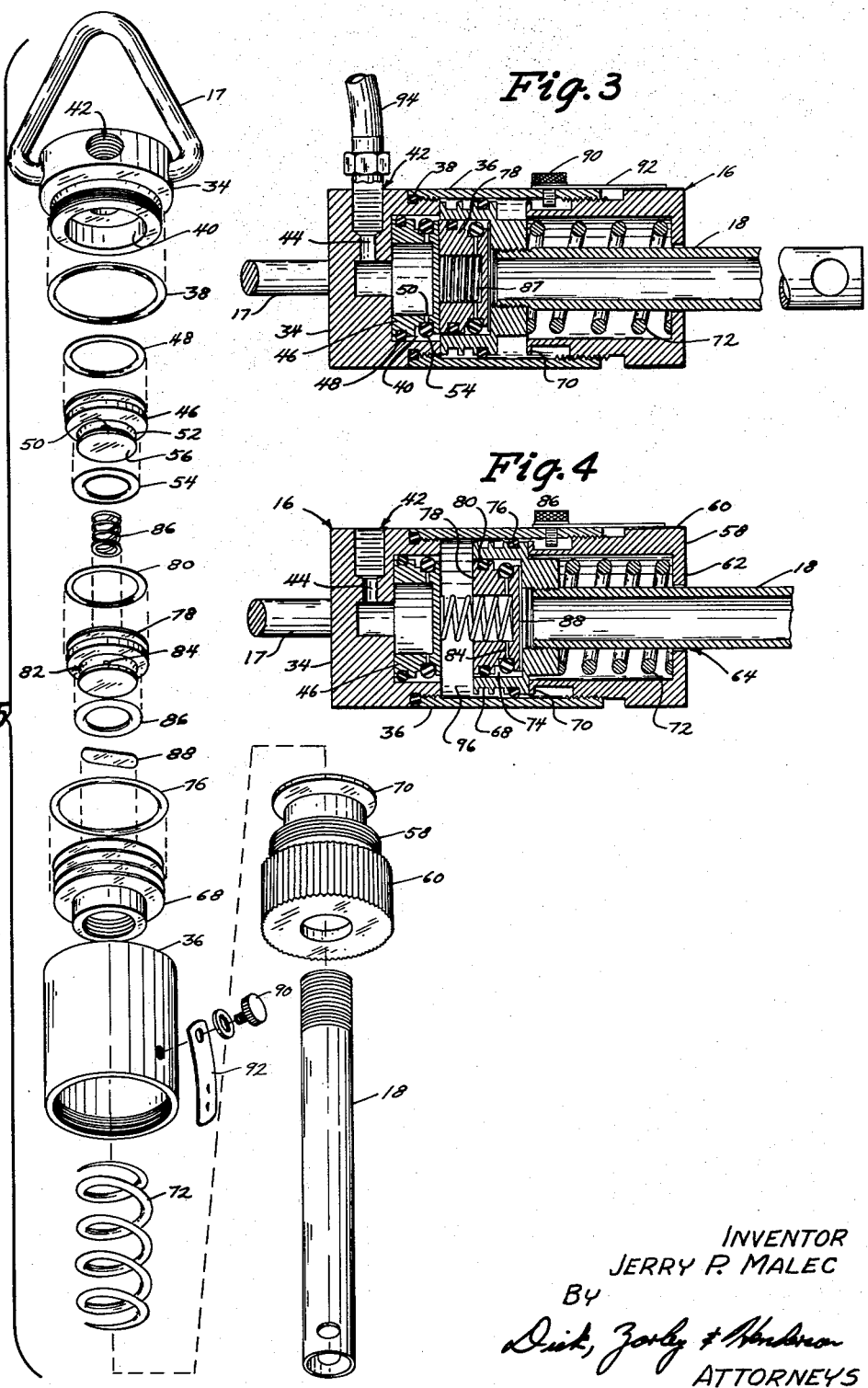
INVENTOR
JERRY P. MALEC
BY
ATTORNEYS United States Patent Office 3,190,266
Patented June 22, 1965

3,190,266
FLUID APPLICATOR FOR ANIMALS
Jerry P. Malec, Omaha, Nebr., assignor to Malco Engineering Company, Omaha, Nebr., a corporation of Nebraska
Filed Jan. 23, 1963, Ser. No. 253,318
13 Claims. (Cl. 119—157)

Fluid applicators for animals have been frequently used, particularly with cattle, and these units generally are designed to dispense fluid onto an animal rubbing element whereupon the fluid will be imparted to the animal's hide as the animal yields to the universal urge to engage the rubbing element. The greatest shortcoming of all these devices is the inability to meter the amount of oil or fluid being dispensed to the rubbing element. This fluid is often expensive insecticide and obviously should not be wasted. Similarly, a shortage of fluid being supplied to the rubbing element will prevent the animals from being properly treated.

Therefore, a principal object of my invention is to provide a fluid applicator for animals which will permit the fluid dispensed to be accurately adjusted and controlled.

A further object of my invention is to provide a fluid applicator for animals which can, if desired, pump the fluid from a remote location.

A still further object of my invention is to provide a fluid applicator for animals that will not be easily subjected to clogging by dirt and the like.

A still further object of my invention is to provide a fluid applicator for animals wherein adjustments can be made in the amount of fluid dispensed without the use of tools and the like.

Still further objects of my invention are to provide a fluid applicator for animals that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIGURE 3 is a sectional view of my device taken on line 3—3 of FIGURE 2, at an enlarged view and shows my device in one of its two extreme operating positions;

FIGURE 4 is a sectional view of my device similar to FIGURE 3 showing my device in a second extreme operating position; and FIGURE 5 is an exploded view of my device showing the interrelation of its component parts.

Figure 1:
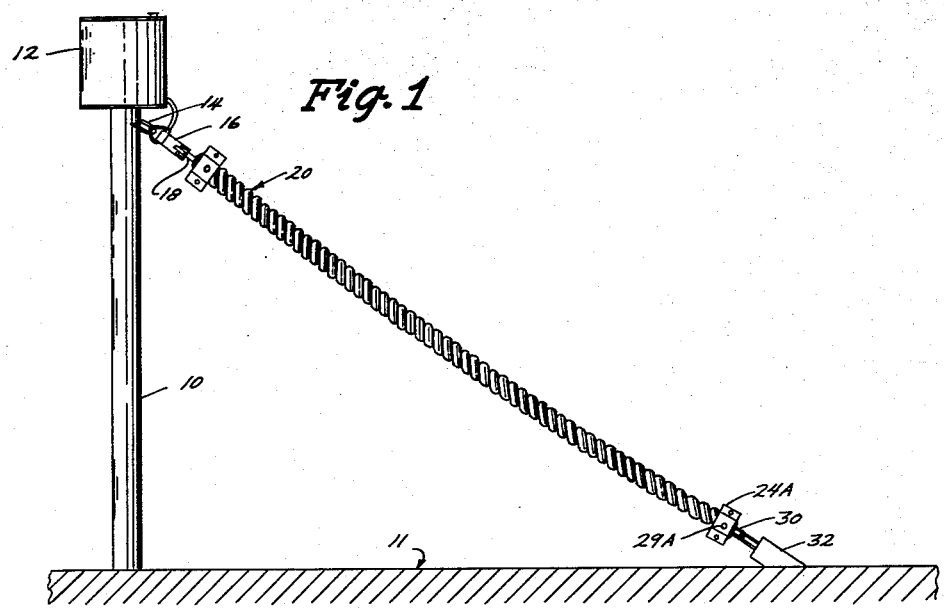
FIGURE 1 is an elevational view of my device mounted on a cattle oiler.
Figure 2:
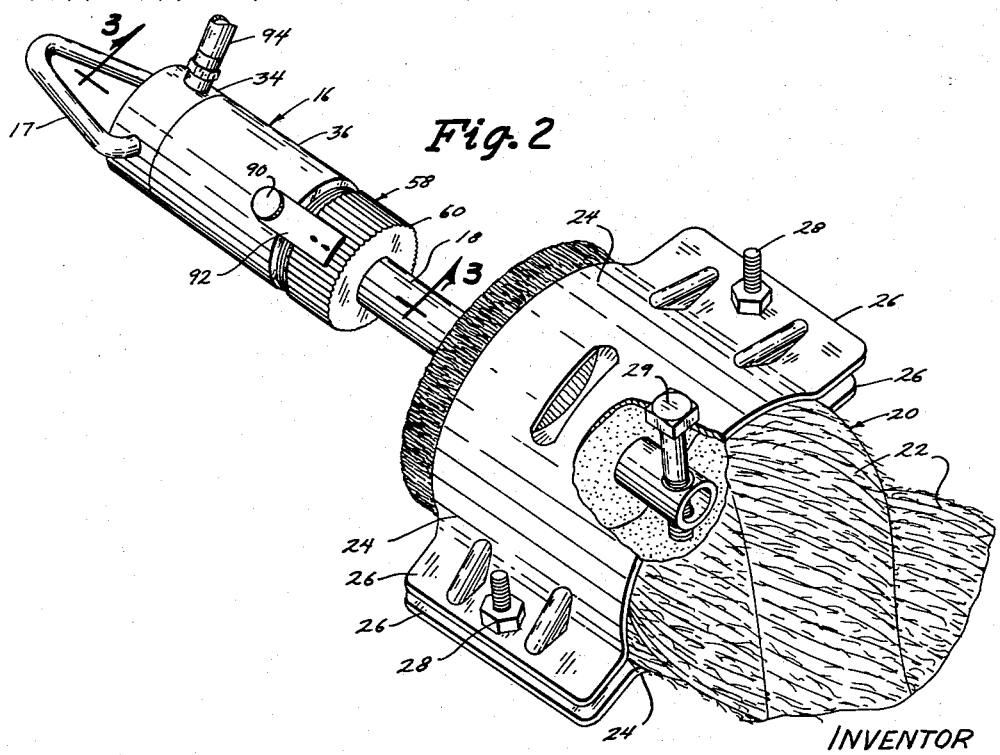
FIGURE 2 is a perspective view of my device drawn to an enlarged scale and showing its connection to a rubbing element. Portions thereof have been cut away to more fully illustrate its construction.

I have used the numeral 10 to designate a vertical supporting post which can either have its lower end embedded in the ground or secured to a horizontal frame 11 of any convenient construction. A fluid reservoir 12 is secured to the top of post 10, although the location of the reservoir is immaterial, and it too could be located either on or under the ground surface. A clevis 14 is pivotally secured to one side of the top portion of post 10. A pump means 16, which will be described in more detail hereafter, has an outwardly extending V-shaped clevis 17 pivotally secured to its upper end and movably intermeshed with clevis 14. Pump means 16 includes an outwardly extending tube 18 which is imbedded within the upper end of rubbing element 20. The rubbing element is comprised of a plurality of spirally-wound fibrous rope elements 22 which in turn are each comprised of a plurality of similarly wound cord elements of the same material. The construction of the rubbing element may vary but it is preferred that it be comprised of a material that can absorb a quanity of insecticide fluid or the like.

Two arcuate collars 24 with flat depending flanges 26 embrace the upper end of rubbing element 20. Nut and bolt assemblies 28 extend through each pair of the coextensive flanges 26 to cause the collars 24 to tightly grip the rubbing element. A nut and bolt assembly 29 protrudes through aligned apertures in each of the collars 24 and in the lower end of tube 18 to rigidly affix the tube to both the rubbing element 20 and the collars.

The rubbing element 20 extends downwardly and outwardly from the top of post 10 where it is secured by means of collars 24A, nut and bolt assembly 29A, and linkage 30 to an anchor element 32. Anchor element 32 may be secured to the horizontal frame 11 or it may be embedded in the ground. The precise construction at the lower end of rubbing element 20 can assume varied designs and is not critical to my invention.

Pump means 16 includes a cylindrical head casting 34 to which clevis 17 is pivotally secured. The lower end of head casting 34 is recessed and is threadably received within the upper end of hollow cylinder 36 which is internally threaded at its upper end. Ring 38 is received in an appropriate groove to seal the head casting 34 to the cylinder 36. With reference to FIGURES 3 and 4, the left end of pump means 16 will be regarded as the "upper" end and the right end as the "lower" end for these are the proper orientations when my device is in its operating position. An annular recess 40 appears in the lower end of head casting 34 and is in communication with fluid intake port 42 by means of conduit 44.

A fluid intake cup 46 is mounted within annular recess 40 of head casting 34 and the hollow interior of the cup is in direct communication with the fluid intake conduit 44. Ring 48 is received within a suitable groove on the outer surface of cup 46 to seal the cup within the recess 40. Radially extending conduits 50 connect the interior of cup 46 with a groove 52 (see FIGURE 5) on the outer periphery thereof. A pliable resilient continuous ring 54 is received within groove 52 and yieldingly seals the outer ends of the two conduits 50. As shown in FIGURES 3 and 4, the bottom 56 of cup 46 has a diameter less than that of the annular recess 40 in head casting 34.

A base casting 58 is threadably received in the lower end of cylinder 36. The lower peripheral portion 60 of the base casting is knurled to facilitate the manual rotation thereof with respect to the cylinder 36. The base casting is hollow except for the closed bottom 62 in which a center aperture 64 appears. Tube 18 slidably extends through aperture 64 and piston head 68 is threadably secured to the upper end thereof. An outwardly depending flange 70 on the upper end of base casting 58 serves as a limiting contact surface between the piston head 68 and the base casting. Coil spring 72 embraces tube 18 within the base casting 58 to normally urge the tube and piston head 68 to the left or upper position shown in FIGURE 3.

An annular recess 74 appears in the upper end of piston head 68. Ring 76 is received within a suitable groove on the outer periphery of the piston head 68 to slidably seal the piston head to the interior of the cylinder. A fluid discharge cup 78 is mounted within the recess 74, and ring 80 in a suitable groove on the outer periphery of the cup seals the recess 74 from direct communication with the interior of the cylinder 36. A groove 82 (see FIGURE 5) appears in the lower peripheral surface of cup 78 and is in communication with the interior of the cup by means of conduits 84. A ring 86 similar to ring 54 is positioned within groove 82 to yieldably close the conduits 84. A coil spring 87 is mounted with the interior of cup 78 and extends upwardly therefrom to forcibly engage the bottom 56 of cup 46 to help maintain the cup 46 in position.

The annular recess 74 within piston head 68 is in direct communication with the interior of tube 18. A thin narrow disc 88 partially covers the upper end of tube 18 at the bottom of annular recess 74 to prevent the cup 78 from "seating" within the recess to seal the recess from the interior of the tube 18.

A knurled screw 90 is threadably inserted into the side of cylinder 36 and extends through clasp 92 to selectively rigidly hold the clasp against the outside of the cylinder and against the knurled portion 60 on the base casting 58. This screw 90 and clasp 92 act to selectively hold the base casting 58 from rotation by friction with respect to the cylinder 36, except when required adjustments are made by twisting base casting 58 thus overcoming the friction.

When the pump means 16 is secured to the rubbing element 20 in the manner described, a hydraulic line 94 is secured to port 42 on head casting 34, and the other end is placed in communication with the fluid reservoir 12. Spring 72 normally holds the component parts of my device in the position of FIGURE 3 with the top of cup 78 directly engaging the bottom 56 of cup 46. When an animal exerts pressure on rubbing element 20, the lower end of tube 18, which is secured to the upper end of the rubbing element, is pulled downwardly. This causes the downward movement of the piston head 68 and cup 78 to the lower extreme position shown in FIGURE 4. This displacement of the piston head 68 tends to cause a vacuum within the area 96 (see FIGURE 4) of cylinder 36. This minus pressure within the area 96 partially distorts the ring 54 within the groove 52 of fluid intake cup 46, and fluid is thence pulled into the area 96 from the reservoir 10, line 94, conduit 44, and interior of cup 46, conduits 50 and thence downwardly around the lower end of the cup.

As pressure is released or minimized on the rubbing element 20, the piston head 68 begins to move back from the position of FIGURE 4 to the position of FIGURE 3 by the expansion of spring 72. This compresses the fluid within the area 96 and causes the ring 54 to seal the conduits 50 in cup 46 so that the inflow of fluid is stopped. At the same time, the fluid endeavors to escape from the interior of cup 78 through the conduits 84, and ring 86 is thereupon expanded to accomplish this outflow. The fluid thereupon flows through the conduits 84, past the then expanded ring 86, around the bottom of the cup 78 and the disc 88, and thence into the upper end of tube 18. The fluid then passes downwardly through tube 18 where it is injected into the interior of the fibrous rubbing element 20. The conduits 50 and 84 in the cup portions 46 and 78, along with the grooves and rings into which they empty, act as restrictor valves. The saturation of the rubbing element by the fluid is soon accomplished by a repetition of the above cycle.

The amount of fluid or oil being supplied to the rubbing element can be adjusted by altering the length of stroke of the piston head 68. This is accomplished by rotating base casting 58. The position of the base casting within cylinder 36 determines the volume of the cylinder between the cups 46 and 78, and hence the capacity of the pump means 16 is also determined. By screwing the base casting 58 into the cylinder 36, the capacity is reduced, and vice versa. The pumping capacity of my device is such that fluid can be lifted from even underground fluid storage tanks.

Thus, from the foregoing, it is seen that my device will accomplish at least all of its stated objectives.

Some changes may be made in the construction and arrangement of my fluid applicator for animals without departing from the real spirit and purpose of my invention, and it is my intention to cover by my claims, any modified forms of structure or use of mechanical equivalents which may be reasonably included within their scope.

I claim:

1. In a pumping mechanism,
    a hollow housing,
    a fluid-receiving port in said housing,
    a first cup portion in said housing and being in communication with said fluid receiving port and having a fluid compartment,
    a restrictor valve in said cup portion adapted upon actuation to yieldingly allow flow of fluid from said cup portion into the interior of said housing,
    a piston movably mounted within said housing,
    a second cup portion within said piston having a fluid compartment and being in communication with the restrictor valve in said first cup portion,
    a spring element in said housing engaging said first and second cup portions and yieldably maintaining said first and second cup portions therein,
    a fluid discharge means on said piston and in communication with the exterior of said housing,
    and a restrictor valve in said second cup portion adapted upon actuation to yieldingly allow flow of fluid from the interior of said housing adjacent the valve in said first cup portion to said fluid discharge means.

2. The structure of claim 1 wherein said housing includes an element threadably movably mounted therein for engaging and limiting the displacement of said piston within said housing.

3. The structure of claim 1 wherein a spring element embraces said fluid discharge means and engages said housing and said piston to normally hold said piston in its closest position with respect to said first cup portion.

4. The structure of claim 1 wherein said housing includes an element threadably movably mounted therein for engaging and limiting the displacement of said piston within said housing, and means connecting said element and said housing to selectively hold said element in one of a plurality of positions.

5. The structure of claim 1 wherein said restrictor valves are comprised of a groove on the outer perimeters of said cup portions, a resilient sealing O-ring in each of said grooves, and at least one conduit connecting said grooves with the fluid compartments of said cup portions.

6. In a pumping mechanism,
    a hollow cylinder having top and bottom ends,
    a head casting threadably secured to the upper end of said cylinder,
    a first cup portion having a fluid compartment,
    a fluid intake port in said head casting and being in communication with said fluid compartment,
    at least one conduit extending laterally outwardly from said fluid compartment and terminating in a continuous groove extending around the perimeter of said first cup portion,
    a resilient ring mounted in said groove,
    a piston slidably mounted in said cylinder,
    said piston having an annular recess,
    a second cup portion mounted in the annular recess of said piston, a fluid compartment in said second cup portion,
at least one conduit extending laterally outwardly from the fluid compartment of said second cup portion and terminating in a continuous groove extending around the perimeter of said second cup portion,
a resilient ring mounted in said groove of said second cup portion,
a second casting closing the lower end of said cylinder,
and a hollow tube secured to said piston and extending through the casting on the lower end of said cylinder,
a spring embracing said hollow tube in said cylinder and engaging said second casting and said piston to normally urge said piston upwardly in said cylinder,
said tube being in communication with said annular recess and the outside of said second cup portion.

7. The structure of claim 6 wherein said casting is threadably movably secured to said cylinder and engages said piston at times to determine the downward movement of said piston in said cylinder.

8. In a fluid applicator for animals,
a vertical post,
an elongated animal rubbing element,
means for anchoring one end of said rubbing element at a point remote from the bottom of said post,
said rubbing element extending upwardly towards the upper portion of said post,
a fluid pumping means connecting the upper end of said rubbing element to the upper end of said post,
said fluid pumping means being adapted for connection to a source of fluid,
said fluid pumping means including a hollow cylinder having top and bottom ends; a head casting threadably secured to the upper end of said cylinder; a first cup portion having a fluid compartment; a fluid intake port in said head casting and being in communication with said fluid compartment; at least one conduit extending laterally outwardly from said fluid compartment and terminating in a continuous groove extending around the perimeter of said first cup portion; a resilient ring mounted in said groove; a piston slidably mounted in said cylinder; said piston having an annular recess; a second cup portion mounted in the annular recess of said piston; a fluid compartment in said second cup portion; at least one conduit extending laterally outwardly from the fluid compartment of said second cup portion and terminating in a continuous groove extending around the perimeter of said second cup portion; a resilient ring mounted in said groove of said second cup portion; a second casting closing the lower end of said cylinder; and a hollow tube secured to said piston and extending through the casting on the lower end of said cylinder; a spring embracing said hollow tube in said cylinder and engaging said second casting and said piston to normally urge said piston upwardly in said cylinder; said tube being communication with said annular recess and the outside of said second cup portion;
the lower end of said tube being in communication with the interior of said rubbing element.

9. In a pumping mechanism,
a hollow cylinder having top and bottom ends,
a head casting threadably secured to the upper end of said cylinder,
a first cup portion in said head casting and having a fluid compartment,
a first groove in the perimeter of said first cup portion,
an O-ring in said first groove said head casting,
a fluid intake port in said head casting and being in communication with said fluid compartment,
at least one conduit extending laterally outwardly from said fluid compartment and terminating in a continuous second groove extending around the perimeter of said first cup portion,
a resilient ring mounted in said second groove,
a piston slidably mounted in said cylinder,
at least one groove in the perimeter of said piston,
an O-ring in said groove of said piston engaging said cylinder,
said piston having an annular recess,
a second cup portion mounted in the annular recess of said piston, a first groove in the perimeter of said second cup portion, an O-ring in said first groove engaging said piston,
a fluid compartment in said second cup portion,
at least one conduit extending laterally outwardly from the fluid compartment of said second cup portion and terminating in a continuous second groove extending around the perimeter of said second cup portion,
a resilient ring mounted in said second groove of said second cup portion,
a second casting closing the lower end of said cylinder,
and a hollow tube secured to said piston and extending through the casting on the lower end of said cylinder,
a spring embracing said hollow tube in said cylinder and engaging said second casting and said piston to normally urge said piston upwardly in said cylinder,
said tube being in communication with said annular recess and the outside of said second cup portion.

10. In a fluid applicator for animals,
a vertical post,
an elongated fibrous animal rubbing element,
means for anchoring one end of said rubbing element at a point remote from the bottom of said post,
a fluid pumping means connecting the upper end of said rubbing element to the upper end of said post,
said pumping means being adapted for connection to a source of fluid,
a piston in said pumping means,
a single rigid fluid discharge tube secured to said piston and extending downwardly into said rubbing element,
and means rigidly connecting said discharge tube to said rubbing element whereby pressure on said rubbing element will cause said discharge tube to actuate said piston.

11. In a fluid applicator for animals,
a vertical post,
an elongated fibrous animal rubbing element,
means for anchoring one end of said rubbing element at a point remote from the bottom of said post,
a hollow cylinder having top and bottom ends,
a head casting threadably secured to the upper end of said cylinder,
means for securing the upper end of said head casting to said vertical post adjacent its upper end,
a fluid-receiving port in said head castings,
a first cup portion in said head casting and having a fluid compartment in communication with said fluid receiving port,
a first restrictor valve in said first cup portion adapted upon actuation to yielding allow flow of fluid from said first cup portion into the interior of said cylinder,
a piston movably mounted within said housing,
a second cup portion within said piston having a fluid compartment and being in communication with said first restrictor valve in said first cup portion,
a spring element in said cylinder engaging said first and second cup portions and yieldably maintaining said first and second cup portions therein,
a fluid discharge means on said piston and in communication with the exterior of said cylinder,
a second restrictor valve in said second cup portion adapted upon actuation to yieldingly allow flow of fluid from the interior of said housing adjacent said first restrictor valve in said first cup housing to said fluid discharge means, the lower end of said fluid discharge means being in communication with the interior of said rubbing element, and means for securing said rubbing element to said fluid discharge means.

12. The applicator of claim 11 wherein said first restrictor valve is actuated by an animal exerting pressure on said rubbing element.

13. The applicator of claim 12 wherein said second restrictor valve is actuated by said animal releasing the pressure exerted on said rubbing element.

References Cited by the Examiner
UNITED STATES PATENTS

| 1,999,655 | 4/35 | Coyle | 103—188 |
| 2,892,448 | 6/59 | Merwin | 119—157 |
| 2,956,543 | 10/60 | Kirk | 119—157 |
| 3,051,128 | 8/62 | McKinley | 119—157 |

SAMUEL KOREN, *Primary Examiner.*

CARL W. ROBINSON, HUGH R. CHAMBLEE,
*Examiners.*